United States Patent [19]

Satou

[11] Patent Number: 5,745,254
[45] Date of Patent: Apr. 28, 1998

[54] IMAGE READING DEVICE USED IN A FACSIMILE MACHINE

[75] Inventor: Tatsuya Satou, Nagoya, Japan

[73] Assignee: Brother Kogyo Kabushiki Kaisha, Nagoya, Japan

[21] Appl. No.: 440,923

[22] Filed: May 15, 1995

[30] Foreign Application Priority Data

May 13, 1994 [JP] Japan ................... 6-124231

[51] Int. Cl.⁶ ................... H04N 1/36; H04N 1/04
[52] U.S. Cl. ................... 358/412; 358/486; 358/474; 358/496; 358/494
[58] Field of Search ................... 358/471, 486, 358/412, 474, 496, 494; 399/208, 396; 355/407, 50

[56] References Cited

U.S. PATENT DOCUMENTS

| | | | |
|---|---|---|---|
| 4,291,339 | 9/1981 | Osawa et al. | 358/428 |
| 5,444,555 | 8/1995 | Ono | 358/494 |
| 5,517,331 | 5/1996 | Murai et al. | 358/486 |
| 5,530,562 | 6/1996 | Eisenbarth et al. | 358/496 |

*Primary Examiner*—Kim Vu
*Assistant Examiner*—Tia M. Harris
*Attorney, Agent, or Firm*—Oliff & Berridge

[57] ABSTRACT

In an image reading device, an image scanner reads data by scanning a document at a fixed speed in a main scanning direction, and a stepping motor feeds the document in an auxiliary scanning direction. In a through-up drive of the stepping motor, the rotational speed of the motor is increased in stepwise manner up to a rated high speed. Before the rotational speed of the motor reaches the rated high speed, the number of lines that the document is fed does not agree to the number of lines scanned by the image scanner. To effectively use the scanned data and to obtain good image, a number of blocks of line data equal to a number of lines fed by the stepping motor when the motor feeds the document at a speed slower than the rated speed is produced by using all of blocks of line data produced from the image scanner during feeding of the document at the slow speed.

17 Claims, 9 Drawing Sheets

IMAGE READING DEVICE USED IN A FACSIMILE MACHINE

BACKGROUND OF THE INVENTION

1. Field of the Invention

The present invention relates to an image reading device used in a facsimile machine.

2. Description of the Related Art

Facsimile machines include an image reading device for optically reading images from an original document. The image reading device has a stepping motor and a CCD image scanner. To read information from an original document, the document is fed in an auxiliary-scanning direction by the stepping motor while the image scanner optically scans the original document in a main-scanning direction perpendicular to the auxiliary-scanning direction. The information optically read during these scans is photoelectrically converted into an electric signal.

The stepping motor is designed to feed the document at a constant speed upon start of feed of the document. The feed speed of the document is synchronized with the scanning speed of the image scanner so that the stepping motor feeds the document one line when the image scanner completes one line scanning in the main-scanning direction.

High speed image reading capability has been required for this type of image reading device. To comply with such a requirement, it is necessary that both the speed at which the image scanner scans documents and the speed at which the document is fed be increased together. Although the scanning speed can be relatively easily increased with the use of CCDs whose performances are greatly improved, it is still difficult to shorten the rise time of stepping motors to a desired extent. Therefore, it has been a conventional practice to employ an acceleration drive (or a so-called through-up drive) wherein the rotational speed of stepping motors is increased in stages starting from a slow speed to finally reach a rated high speed.

However, more time is required to feed the document one line's distance at the initial slow speed of the motor than when the motor is rotating at its rated speed. As a result, the document feed speed and the scanning speed get out of synchronization so that the document is fed fewer line's distance than the number of lines scanned by the image scanner. When the data read while the motor was speeding up in stages is transmitted to and reproduced by a remote facsimile machine, the reproduced image may be distorted to extend in the auxiliary-scanning direction.

Figure 1:
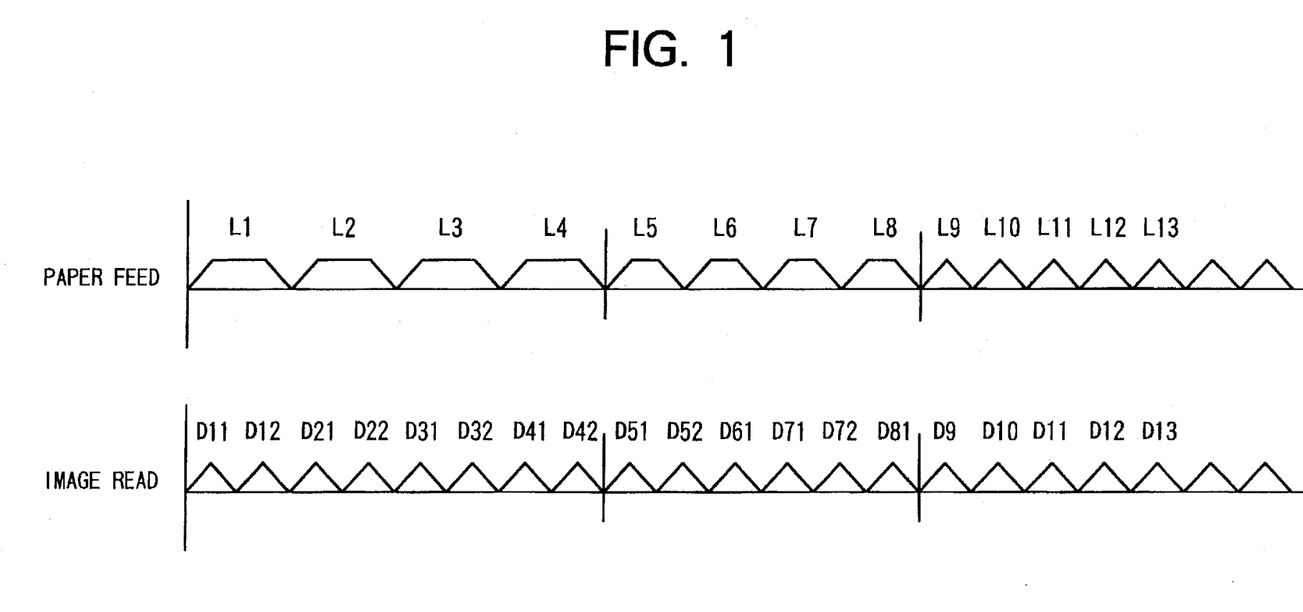
FIG. 1 is a timing chart for describing an operation of a conventional image reading device.

To make the number of lines that the document is fed match the number of lines scanned by the image scanner, a method has been known of discarding a portion of the data read by the image scanner while the motor is changing speed. This method will be described while referring to the time chart shown in FIG. 1. It will be assumed that the motor of this conventional image reading device feeds a document one line every five milliseconds at its rated speed (high speed) and that the image scanner performs one line scan over the document every five milliseconds. If the motor starts feeding the document at an initial slow speed (that is, speed directly after start up) of one half the rated speed, then the image scanner will perform two scans every time the document is fed one line's distance. Therefore, the data D11 read in the first scan will be discarded and data D12 read in the second scan will be used to form pixel data of the first line L1. Afterward, the feed speed of the motor is increased to two thirds the rated speed. In the time required to feed the document two line's distance at this intermediate speed (i.e., 15 milliseconds), the image scanner scans the document three times. Therefore, the data D51 read in the first scan at the intermediate speed will be discarded and data D52 of the second scan at intermediate speed will be used for pixel data of line L5 and data D61 will be used for pixel data of line L6.

However, discarding a portion of read pixel data causes problems. For example, when data read for a thin black line on the document is discarded, the thin black line will not appear when the image of the document is reproduced. Contrarily, white portions existing in black background may disappear if the corresponding data is discarded. The resulting images can be of inferior quality.

SUMMARY OF THE INVENTION

It is an object of the present invention to overcome the above-described difficulties and to provide an image reading device capable of obtaining good images even when the scanning speed of the image scanner is maintained constant while the motor is starting up.

To achieve the above and other objects, the present invention provides an image reading device which includes an image scanner, a motor, and speed control means. The image scanner is provided for reading an image from a document by scanning the document at a fixed speed in a main-scanning direction. The motor is provided for feeding the document at a speed in an auxiliary-scanning direction perpendicular to the main-scanning direction. The speed control means controls the speed at which the motor feeds the document. In the present invention, there are provided first read control means, second read control means, and a third read control means. The first read control means is provided for obtaining one line's worth of data from data obtained by M-scans of the image scanner when the motor is feeding the document at a first speed A. The second read control means is provided for obtaining one line's worth of data from data obtained by N-scans of the image scanner when the motor is feeding the document at a second speed A×M/N. The third read control means is provided for obtaining a-number lines' worth of data, each line's worth of data of the a-number lines' worth of data being obtained by m-scans of the image scanner, and for obtaining b-number lines' worth of data, each line's worth of data of the b-number lines' worth of data being obtained by n-scans of the image scanner, when the motor is feeding the document at a third speed that is between the first speed A and the second speed A×M/N. A relationship between values of M, N, a, b, m, and n is represented by:

$$N > (ma+nb)/(a+b) > M.$$

Preferably, a relationship between the values of M, N, m, and n is given by:

$M \geq m$; and $N \geq n$.

More preferably, $M = m = 1$.

Calculation means is further provided for calculating data in a present line based on data of a proceeding line and data obtained from a plurality of scans by the image scanner.

In the rated operation, data read during M-number of scans by the image scanner are used to form one line's worth of pixel data. When the motor first begins to feed the document in the auxiliary-scanning direction, the second read control means sets the scanning speed of the image scanner to a predetermined speed, and the speed controlling means sets the document feed speed of the motor to M/N of the rated speed A. As a result, while the document is fed one line's distance, N/M-number of scans are performed. Afterward, the third read control means sets the document feed speed to the third speed, which is between the rated speed A and the second speed A×M/N. The number of scans used to make up each line while the document is fed at the third speed, is a value between the number of scans used to make up each line while the document is fed at the first speed and the second speed. In this way, the document is fed by the motor and scanned by the image scanner in synchronization.

Afterward, the first read control means controls the speed controlling means to increase the speed at which the motor feeds the document in the auxiliary-scanning direction to the rated speed. The first read control means also causes the image scanner to scan the document M-number of times while the document is fed one line.

The image reading device of the present invention maintains synchronization between scanning by the image scanner and the speed at which the motor feeds the document when the speed of the motor is increased from the second speed to the rated speed.

The calculation means uses logic calculation to calculate a value based on data from N-number of scans by the image scanner and pixel data from the directly proceeding line.

In this way, when the motor of the image reading device of the present invention is initially driven at the second speed, which is M/N of the rated speed, and later driven at the third speed, the document can be fed and scanned in synchronization. All read data are used to create pixel data. A good image can therefore be reproduced.

In accordance with another aspect of the invention, there is provided an image reading device including an image scanner, a motor, speed control means, and line data producing means. The image scanner reads an image from a document by repeatedly scanning the document on a line-to-line basis at a fixed speed. The image scanner produces a block of line data whenever the image scanner scans one line of the document. The block of line data includes pixel data on each pixel aligned on a line of the document along which the image scanner scans. The motor feeds the document at a speed in a direction perpendicular to a direction in which the image scanner scans the document. The speed control means is provided for controlling the motor so that the speed at which the motor feeds the document is selectively changed to a first speed, a second speed slower than the first speed, and a third speed slower than the second speed. Scanning the document by the image sensor is performed in synchronization with feeding the document by the motor when the motor feeds the document at the first speed. The line data producing means is provided for producing a number of blocks of line data equal to a number of lines fed by the motor when the motor feeds the document at the second speed or the third speed by using all of blocks of line data produced from the image scanner during feeding of the document at the second speed or the third speed.

At least one of the blocks of line data produced by the line data producing means is produced by combining a predetermined number of consecutive blocks of line data produced from the line sensor during feeding of the document at the second speed or the third speed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

An image reading device according to a preferred embodiment of the present invention will be described while referring to the accompanying drawings.

Figure 2:
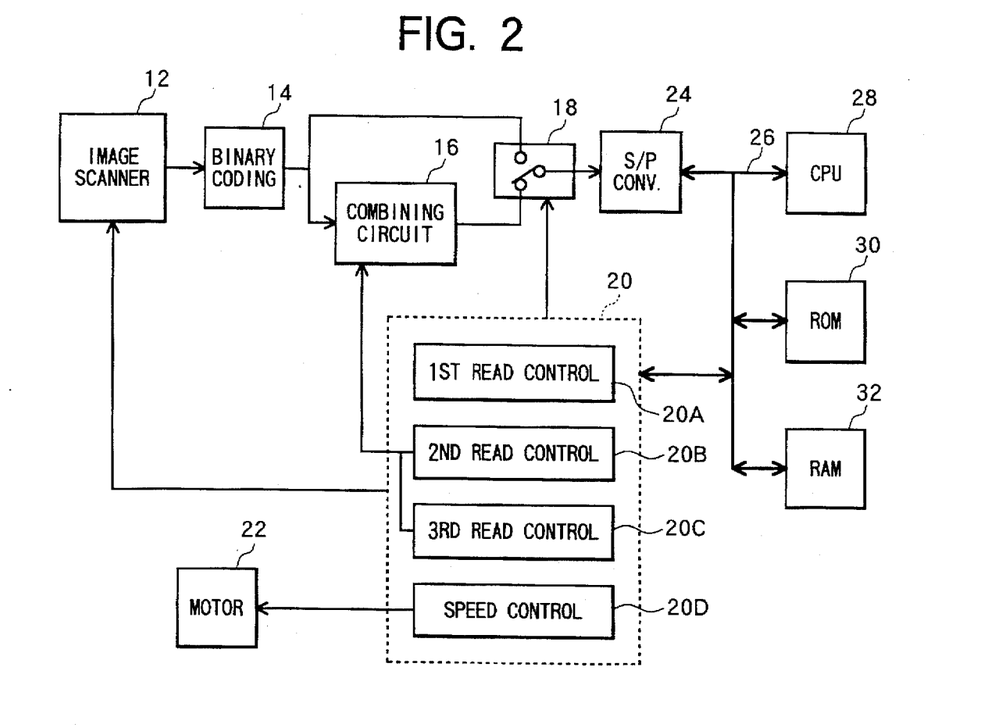
FIG. 2 is a block diagram showing an electrical arrangement of an image reading device according to a first embodiment of the present invention.

The image reading device shown in FIG. 2 includes a serial-to-parallel (S/P) conversion circuit 24, a CPU 28, a ROM 30 for storing control information, a RAM 32 for storing pixel data, and a read control circuit 20, all connected by a bus line 26. The read control circuit 20 includes a first read control section 20A, a second read control section 20B, a third read control section 20C, and a speed control section 20D. The read control circuit 20 is connected to an image scanner 12. The speed control section 20D of the read control circuit 20 is connected to a stepping motor 22. The read control circuit 20 sends a drive signal to the image scanner 12 and also sends a drive pulse to the motor 22 in synchronization with the drive signal to the image scanner 12. The second read control section 20B and the third read control section 20C are connected to a combining circuit 16 to send a control signal (SEL) thereto. The read control circuit 20 is also connected to a change-over switch 18 to send a switch signal thereto.

The image scanner 12 is formed from a one-dimensional image sensor having 1,728 pixel reading elements and so is capable of reading an entire line of an A4 size document at once. The image scanner 12 is driven in accordance with the drive signal supplied from the read control circuit 20 to read images from documents at a speed of five milliseconds per scan in the main-scanning direction and photoelectrically converts the pixels of read images into an analog electrical signal.

A binary coding circuit 14 is connected to the output of the image scanner 12 and converts the analog signal from the image scanner 12 into a binary signal by comparing the level of the analog signal with a reference level. The binary coding circuit 14 outputs the binary signal to the change-over switch 18 either directly or via the combining circuit 16.

The first read control section 20A controls the motor 22 to operate at its rated speed (first speed) and also switches the change-over switch 18 to receive output directly from the binary coding circuit 14 (i.e., not from the combining circuit 16). The second read control section 20B controls the motor 22 to operate at one half the rated speed and also switches the change-over switch 18 to receive output from the combining circuit 16. The third read control section 20C controls the motor 22 to operate at two thirds the rated speed and also switches the change-over switch 18 to receive output either directly from the binary coding circuit 14 or via the combining circuit 16, whichever is appropriate as determined in a manner to be described later. The speed control section 20D controls the speed of the motor 22 according to instructions from the first to third read control sections of the read control circuit 20.

The combining circuit 16 operates in accordance with the control signal (SEL) from the read control circuit 20 to perform a prescribed calculation (to be described later) based on the binary data from the binary coding circuit 14. The combining circuit 16 outputs the result of the calculations as pixel data.

The motor 22 is a stepping motor for feeding documents in an auxiliary-scanning direction perpendicular to the main-scanning direction. The motor 22 is driven by way of 2-2 phase excitation and feeds a document one line's distance in four steps. When driven by application of 800 pulses per second, the motor 22 can feed documents one line with five milliseconds.

The pixel data outputted from the binary coding circuit 14 as a serial signal is inputted to the change-over switch 18, either directly or via the combining circuit 16 as selected using the switch signal from the read control circuit 20, and is then outputted to the S/P conversion circuit 24, where it is converted into a parallel signal. The S/P conversion circuit 24 outputs the parallel signal to the bus line 26.

The CPU 28 stores pixel data transmitted from the S/P conversion circuit 24 into the RAM 32 and transmits this pixel data to a remote facsimile machine via a modem (not shown).

Figure 3:
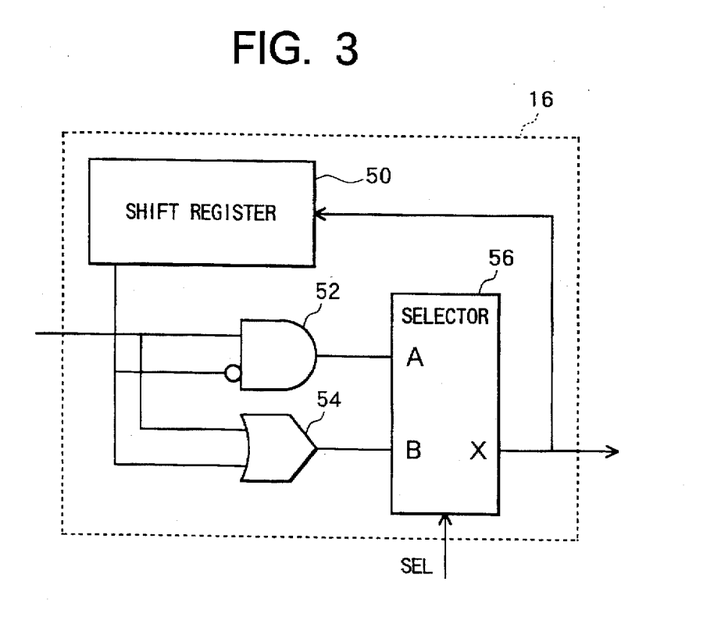
FIG. 3 is a circuit diagram showing a combining circuit shown in FIG. 2.

FIG. 3 shows an example configuration of the combining circuit 16 with virtually the same configuration of conventional combining circuits for reading images from documents more precisely by narrowing the scan interval. The combining circuit 16 includes a shift register 50, an AND circuit 52, an OR circuit 54, and a selector 56 and as is configured to perform a logic calculation (to be described later).

One terminal of each of the AND circuit 52 and the OR circuit 54 is connected to receive binary data outputted from the binary coding circuit 14. The inverted terminal of the AND circuit 52 and the other terminal of the OR circuit 54 are connected to receive output from the shift register 50, whose input is connected to the selector 56. The shift register 50 is designed to store one scan line's worth of pixel data (i.e., 1,728 pixels) from the selector 56 for a duration of time equivalent to one scan (i.e., five milliseconds) before outputting the pixel data to the AND circuit 52 and the OR circuit 54. The output terminal of the AND circuit 52 is connected to the terminal A of the selector 56 and the output terminal of the OR circuit 54 is connected to the terminal B of the selector 56. The selector 56 is designed to output, from its terminal X, data inputted either to its terminal A or B, depending on the control signal (SEL) from the read control circuit 20.

Figure 4:
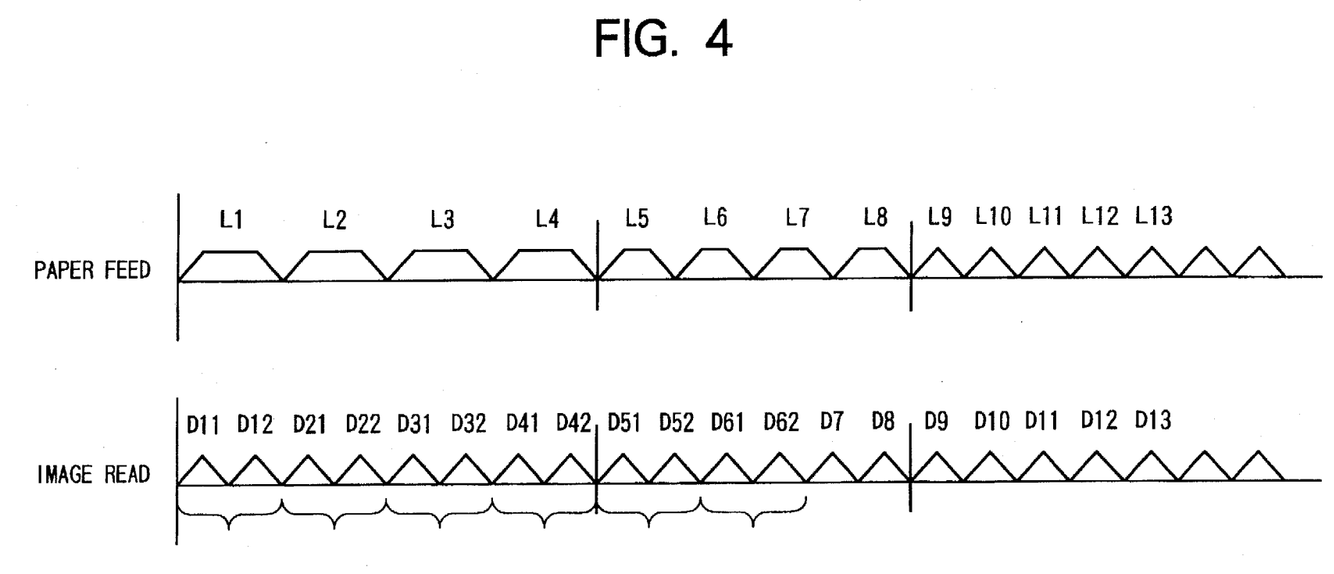
FIG. 4 is a timing chart for describing an operation of the image reading device according to the first embodiment of the present invention.

Next, a description of image reading operations performed by the image reading device of the present embodiment will be provided while referring to FIGS. 2 through 5. The motor 22 of the present embodiment is driven at different increasingly rapid speeds to bring the read speed of the image reading device to a high speed. FIG. 4 is a time chart comparing timing of step feed of the document by the motor 22 with timing of scans by the image scanner 12. When the motor 22 is energized, the second read control section 20B of the read control circuit 20 applies a drive pulse of 400 pulses per second (i.e., one half the rated speed) to the motor 22 via the speed control section 20D. As a result, the motor feeds the document one line with ten milliseconds. FIG. 4 shows one of lines L1, L2, L3, and L4 fed with each ten milliseconds. Although only four lines L1 through L4 are depicted to indicate the lines fed with 400 pps (pulses per second) through-up drive, 32 lines are fed with the 400 pps through-up drive.

The second read control section 20B applies the drive signal to the image scanner 12. In response thereto, the image scanner 12 scans the document once every five milliseconds (i.e., at the predetermined interval) and outputs the read pixel data as an analog signal to the binary coding circuit 14. The binary coding circuit 14 converts the analog signal for each one line's worth of data from each scan into a binary data (i.e., D11, D12, and so on shown in FIG. 4) at five millisecond cycles. While the motor 22 is being driven at the slow speed, the second read control section 20B controls the change-over switch 18 to connect the combining circuit 16 to the S/P conversion circuit 24. The combining circuit 16 performs calculations on pixel data read during two scans by the image scanner 12.

Figure 5:
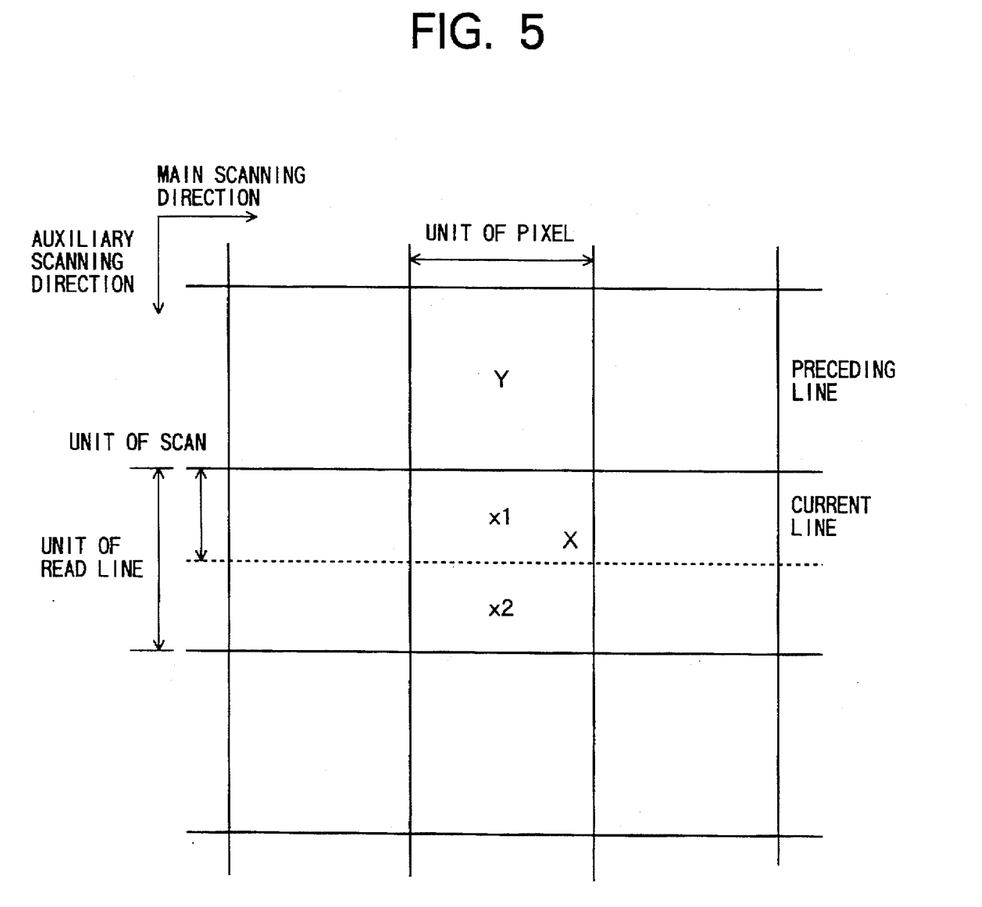
FIG. 5 is a diagram showing a positional relationship between pixel data.

FIG. 5 shows the positional relationship of pixels read by scanning a document in the main-scanning direction while the motor 22, driven at one half the rated speed, feeds the document in the auxiliary-scanning direction. In this example, it will be assumed that pixel data Y corresponds to the line L1 of FIG. 4 and that pixel data X corresponds to the line L2 of FIG. 4. It will also be assumed that binary data x1 and x2 shown in FIG. 5 correspond to the binary data D21 and D22 of FIG. 4. Pixel data Y is from a line directly proceeding the current line in the auxiliary-scanning direction. When the motor 22 is being driven at half speed, it feeds the document half as quickly as when driven at the rated speed. Therefore, the image scanner 12 completes two scans in the time required for the document to move one line distance. As a result, the pixel data X of the currently scanned line is read in two adjacent scans, which are converted to binary data x1 and x2 respectively by the binary coding circuit 14.

The combining circuit 16 shown in FIG. 3 uses binary data outputted from the shift register 50 (which corresponds to the pixel data Y) and the binary data from the binary coding circuit 14 (which corresponds to the pixel data x1 and x2) to determine the pixel data X of the current line using a logic of inverted Y·x1+x2. In this example, a black information (dot) will be represented by "1" and white information (no dot) by "0".

The image scanner 12 reads the binary data D21 during a first scan. The binary data x1 included in binary data D21 is outputted from the binary coding circuit 14 to one of the input terminals of the AND circuit 52. The pixel data Y of the proceeding line held in the shift register 50 is inputted to the inverted input terminal of the AND circuit 52 simultaneously with input of the binary data x1. The AND circuit 52 outputs the ANDed result, i.e., inverted Y·x1, to the terminal A of the selector 56. At this time, the second read control section 20B outputs a high-level (1) control signal (SEL) to the selector 56, causing the selector 56 to output from its terminal X the binary data inputted to its terminal A. In other words, the ANDed output from the AND circuit 52 is inputted, via the selector 56, to the shift register 50, where it is held temporarily.

Next, the image scanner performs a second scan and reads the binary data D22. The binary data x2 included in the binary data group D22 is outputted from the binary coding circuit 14 and applied to one of the input terminals of the OR circuit 54. The (inverted Y·x1) output from the AND circuit 52 is inputted to the other input terminal of the OR circuit 54. The OR circuit 54 outputs the ORed results, that is, the (inverted Y·x1+x2) binary data, to the terminal B of the selector 56. At this time, the second read control section 20B outputs a low-level (0) control signal SEL to the selector 56, which causes the selector 56 to output the (inverted Y·x1+x2) binary data from its terminal X. That is, the selector 56 outputs, from its terminal X, pixel data X based on the binary data obtained by the two scans. This binary data is stored in the shift register 50 and used as proceeding line binary data Y when scanning the next line.

After the second scan, the CPU 28 stores the (inverted Y·x1+x2) binary data, that was outputted from the terminal X of the selector 56, in the RAM 32 in synchronization with the motor 22 feeding the document one line's distance. The image reading device repeats the above calculation while the motor 22 is driven at half the rated drive speed.

After the document has been fed a predetermined number of lines at the slow speed, the read control circuit 20 increases the speed of the motor 22 to two thirds the rated speed (that is, two thirds the high speed) using its third read control section 20C. In this example, in this intermediate feed speed, one line is fed every 7.5 seconds so that the document is fed four lines in 30 milliseconds while the image scanner 12 scans the document six times during the same time. In the example shown in FIG. 4, while the document is fed the distance of lines L5 through L8 by the motor 22 at intermediate speed, binary data D51 through D8 are obtained with six scans of the image scanner 12. Actually, during this period the motor 22 feeds the recording medium 32 lines, but description will be performed assuming four lines for convenience sake.

Although the speed of motor 22 is changed to this intermediate speed, the third read control section 20C continues to control the change-over switch 18 to connect the output of the combining circuit 16 to the S/P conversion circuit 24. Therefore, at a five-millisecond scan cycle, the image data for line L5 is calculated from the binary data D51 and D52 and the image data for line L6 is calculated from the binary data D61 and D62. The resultant image data is outputted to the S/P conversion circuit 24.

When the scan for reading binary data D62 is completed, the third read control section 20C controls the changeover switch 18 to directly connect the output of the binary coding circuit 14 to the S/P conversion circuit 24. As a result, the binary data D7 and D8, that are produced at the binary coding circuit 14 from data read by the image scanner 12, are inputted as image data for lines L7 and L8 directly to the S/P conversion circuit 24 without being processed by the combining circuit 16. The above-described output processes are repeated while the motor 22 is being driven at the intermediate speed.

When the document has been fed a predetermined number of lines at the intermediate speed, the read control circuit 20 drives the motor at the rated speed of 800 pps using its first read control section 20A. The read control circuit 20 also drives the change-over switch 18 to connect the output of the binary coding circuit 14 directly to the S/P conversion circuit 24. This results in data read by the image scanner 12 and binary coded at the binary coding circuit 14 being outputted directly to the S/P conversion circuit 24 as read pixel data. Because the time for feeding the document one line at the rated speed and the scanning speed of the image scanner 12 are synchronized, the data D9, D10, and on read for lines L9, L10, and on can be used as is for image data.

According to the present invention, when the motor 22 first starts feeding a document, it is driven to feed the document in the auxiliary-scanning direction at one half its rated speed. Because, during this time, one line's worth of pixel data is obtained by two scans of the image scanner 12, the document is fed by the motor 22 in synchronization with the read of images from the document by the image scanner 12. The data for the present line is determined by subjecting image data from two scans of the image scanner 12 and image data of a proceeding line to the above-described logic calculations.

When the feed speed of the motor 22 is increased to two thirds the rated speed, images are formed from pixel data obtained from single scans and also from combining data from two scans. That is, the above-described logic calculations allow all read data to be used to create pixel data. In this way, a good images can be reproduced.

While the document is being fed at the intermediate feed speed, the feed speed is two thirds (⅔) of the rated speed and six scans are performed by the image scanner 12. To produce four lines' worth of image data, the read control circuit 20 causes four of the six scans' worth of data read by the image scanner 12 to pass through, and be subjected to calculations of, the combining circuit 16 and causes the remaining two scans' worth of data to be outputted directly from the binary coding circuit 14.

When the motor 22 is driven at a speed Q/M (wherein Q/M is greater than one half but less than one, i.e., less than the rated speed; Q and M being integers) so that the document is fed Q-number of lines in the auxiliary-scanning direction while M-number of scans are performed by the image scanner 12, the relationship between how many scans' worth of data the read control circuit 20 causes to pass through the combining circuit 16 and how many it causes to be outputted directly from the binary coding circuit 14 can be represented by the following formulas:

$$M=2a+b;$$

$$Q=a+b$$

wherein a is the number of scans' worth of data subjected to calculations in the combining circuit 16 (two scans' worth in the present embodiment); and b is the number of scan's worth of data outputted directly from the binary coding circuit 14 (one scan's worth in the present embodiment).

By assuming further that c represents the time required to feed the document one line at the rated speed (i.e., five milliseconds in the present embodiment), then to feed the document Q-line's distance (i.e., four lines in the present embodiment) at a feed speed of Q/M will require a time duration cM (i.e., 30 seconds in the present embodiment), although the time required for a single scan remains the time duration c (5 seconds). Therefore, the time required for a-number of scan's worth of data to be outputted from the combining circuit 16 is 2ac (i.e., 20 seconds in the present embodiment) and the time required for b-number of scan's worth of data to be outputted directly from the binary coding circuit 14 is bc (i.e., 10 milliseconds in the present embodiment). The total time for all scans is 2ac+bc=c(2a+b)=cM (30 milliseconds), which is equal to the time required to feed the document Q-lines distance. Using the logic shown in FIG. 3, the time required for the motor to feed the document and the time required to scan the document are coordinated, and coordination between the number of lines fed and the number of scans can be maintained.

In the example shown in FIG. 4, the document was fed four lines-distance at a slow feed speed (Q/M) that is two thirds (⅔) the rated speed. However, the document need be fed only the minimum of number of lines allowable by the value Q (i.e., two in this example) and timing for feeding and scanning the document will be in coordination. In this example, if the document is fed two lines (which requires 15 seconds), data from two scans are combined into one line's worth of data in time 2ac (ten milliseconds), and data from one line is outputted directly from the binary coding circuit 14 in time bc (five milliseconds). All scans take a total time cM (15 milliseconds) to complete. This is also the time required for the motor to feed the document two-lines distance.

Next, a description of an image reading device according to a second embodiment will be provided while referring to FIGS. 6(A) and 6(B). In the first embodiment, the setting of the change-over switch 18 was maintained after the speed of the motor 22 was increased from the slow speed to the intermediate speed so that data continues to be processed in the combining circuit 16 for a-number of scans of data. Then, the setting of the change-over switch 18 was switched so that one scan's worth of data is outputted directly from the binary coding circuit 14. Afterward, the speed of the motor 22 was increased to the rated speed while data continued to be outputted directly from the binary coding circuit 14.

In contrast to this, after the speed of the motor 22 is increased to the intermediate speed in the second embodiment, data is outputted to the S/P conversion circuit 24 alternately via the combining circuit 16 and directly from the binary coding circuit 14. The image reading unit of the second embodiment operates in the same manner as in the first embodiment when the motor 33 is driven at the slow and rated speeds.

In this embodiment, the intermediate speed will be two thirds the rated speed as in the first embodiment. Therefore, during the 30 milliseconds that the image scanner 12 performs six scans, the document will be fed four lines. Because the third read control section 20C controls the change-over switch 18 so as to continuously connect the output from the combining circuit 16 to the S/P conversion circuit 24 after the slow speed is shifted to the intermediate speed, the combining circuit 16 calculates and outputs pixel data of line L5 based on the binary data D51 and D52.

When the scan for the binary data group D52 is completed, the third read control section 20C controls the change-over switch 18 to connect the output from the binary coding circuit 14 directly to the S/P conversion circuit 24. Therefore, the binary data D6 produced in the binary coding circuit 14 is outputted directly to the S/P conversion circuit 24 as pixel data for line L6. Afterward, the third read control section 20C again controls the change-over switch 18 to connect the output of the combining circuit 16 to the S/P conversion circuit 24. Therefore, the combining circuit 16 calculates and outputs pixel data for line L7 based on binary data groups D71 and D72. When the scan for the binary data group D72 is completed, the read control circuit 20 controls the change-over switch 18 to connect the output of the binary coding circuit 14 directly to the S/P conversion circuit 24. Therefore, the binary data group D8 produced at the binary coding circuit 14 is inputted directly to the S/P conversion circuit 24 as pixel data for the line L8.

After inputting data to the S/P conversion circuit 24 alternately from the combining circuit 16 and directly from the binary coding circuit 14, first read control section 20A increases the speed of the motor 22 to the rated speed. As a result, binary data groups D9, D10, and so on for each scanned line are outputted directly from the binary coding circuit 14 to the S/P conversion circuit 24.

In the example described while referring to FIG. 6(A), correspondence was obtained when pixel data was outputted from the combining circuit 16 and directly from the binary coding circuit 14 two times each (i.e., both "a" and "b" was two) because the intermediate speed was set to two thirds the rated speed. However, if the intermediate speed was set to six sevenths (6/7) of the rated speed, then the document will be fed six lines (i.e., Q=6), pixel data will be outputted once from the combining circuit 16 (i.e., a=1), and pixel data will be outputted five times from the binary coding circuit 14 (i.e., b=5). As shown in FIG. 6(B), first, binary data D1 and D2 are outputted directly from the binary coding circuit 14 to the S/P conversion circuit 24 as pixel data for lines L1 and L2. Next, binary data D31 and D32 are combined at and outputted from the combining circuit 16 as line L3. Afterward, binary data D4, D5, and D6 are outputted directly from the binary coding circuit 14 to the S/P conversion circuit 24 as pixel data for lines L4, L5, and L6. In this way, pixel data is alternately outputted from the combining circuit 16 and the binary coding circuit 14.

Figure 6:
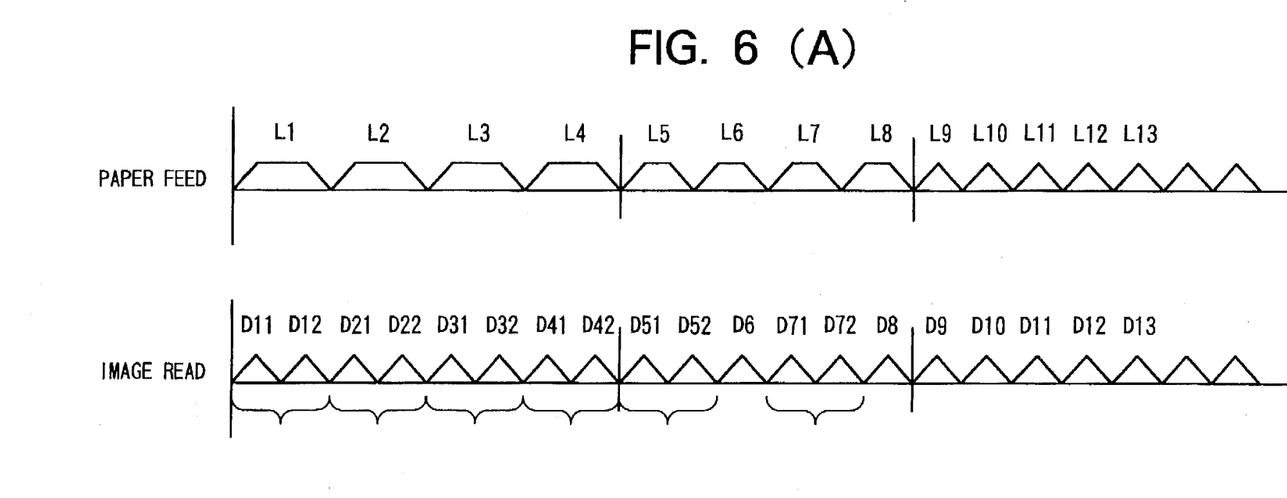
FIGS. 6A and 6B are timing chart for describing an operation of the image reading device according to a second embodiment of the present invention.

In the second embodiment, reading of data on a line of the document is timingly in coincidence with feeding the corresponding line on the document by the motor 22. That is, in the first embodiment the time shift shown in FIG. 4 between when the document is fed at line L6 and when the binary data D61 and D62, which become the pixel data for line L6, are read is greater than the time shift shown in FIG. 6 between when the document is fed at line L6 and when the binary data group D6 is read.

Although only one intermediate speed (i.e., two thirds the rated speed) was provided in the first and second embodiments, many intermediate speeds can be provided, such as intermediate speeds that are five eighths, six eights, and seven eights the rated speed, so that the speed of the motor 22 is more gradually increased. In this case, the number of times the document is fed and the number of times the document is scanned can be coordinated.

Also, in the first and second embodiments, the value of pixel data X was determined by inverted Y·x1+x2 logic. The inverted Y value, that is, the value produced by inverting the value of the pixel in the proceeding line (Y), was used in the logic calculations because this increases the likelihood that pixels of the current line (X) will be white when corresponding pixels of the proceeding line (Y) are black, so that as many fine lines can be reproduced as possible.

Figure 7:
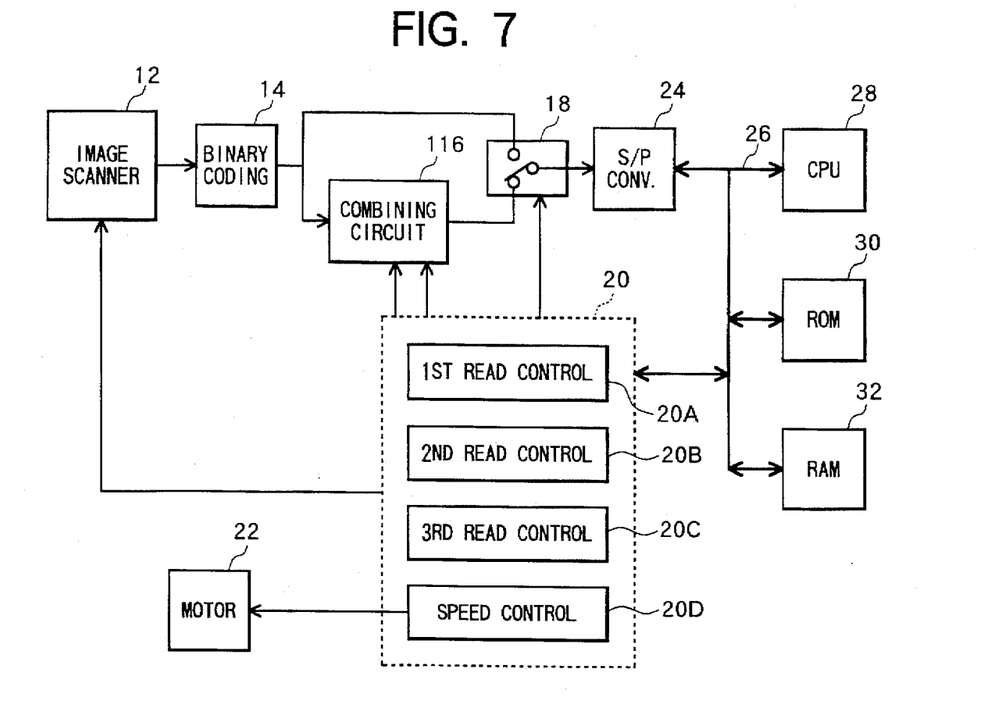
FIG. 7 is a block diagram showing an electrical arrangement of an image reading device according to a third embodiment of the present invention.
Figure 8:
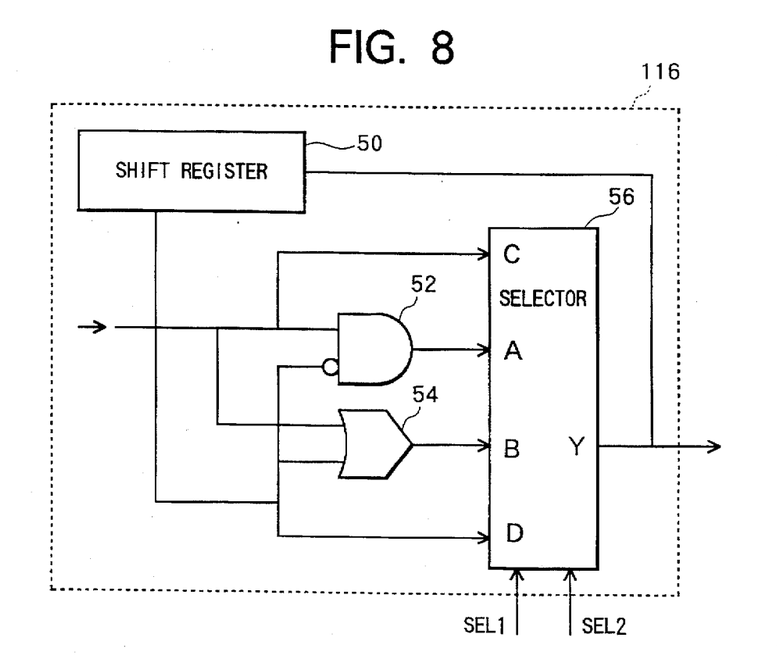
FIG. 8 is a circuit diagram showing a combining circuit shown in FIG. 7.
Figure 9:
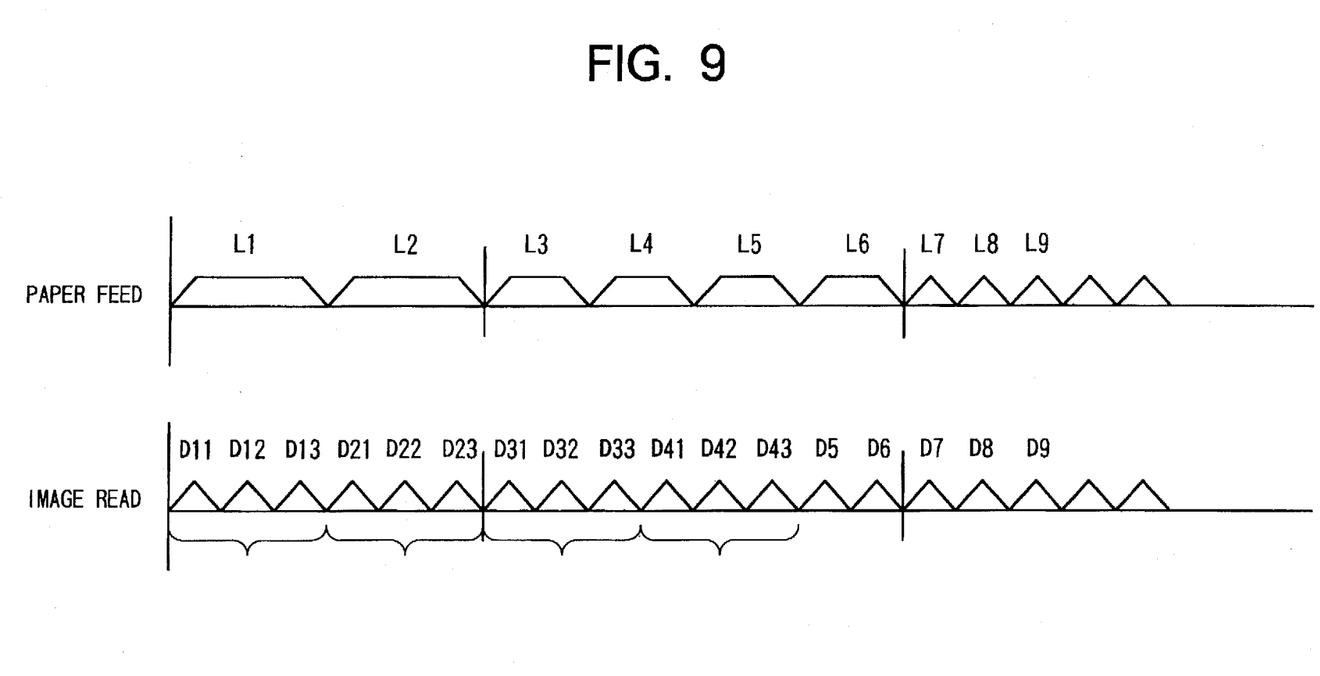
FIG. 9 is a timing chart for describing an operation of the image reading device according to the third embodiment of the present invention.

Next, a description of an image reading device according to a third embodiment of the present invention will be provided while referring to FIGS. 7 through 9. First, the electrical arrangement of components will be described while referring to FIG. 7. A combining circuit 116 is used in place of the combining circuit 16 of the first and second embodiments. Although the combining circuit 16 of the first and second embodiments combined data from two scans to produce one line's worth of pixel data, the combining circuit 116 of the third embodiment combines data from three scans to produce one line's worth of pixel data. Similar to the combining circuit 16 of the first and second embodiments, the combining circuit 116 also calculates pixel data corresponding to one pixel of the current line based on image data of the proceeding line and data obtained by three scans by the image scanner 12.

As shown in FIG. 8, a selector 56' of the combining circuit 116 includes, in addition to components of the selector 56 of the combining circuit 16 in FIG. 3, a terminal C into which is inputted data from the binary coding circuit 14 and a terminal D into which is inputted data from the shift register 50. The selector 56 selectively outputs data inputted to the terminals A, B, C, or D based on the two-bit control signals SEL 1 and SEL 2 from the read control circuit 20.

Next, a description of image read operations by the image reading device of the third embodiment will be provided while referring to FIG. 9. At first, the second read control section 20B applies to the motor 22 a signal with one third (⅓) the number of drive pulses per second than applied at the rated speed. The motor 22 therefore feeds the document one line every 15 milliseconds. As shown in FIG. 9, lines L1 and L2 are fed in fifteen milliseconds.

On the other hand, the second read control section 20B repeatedly applies drive pulses at a fixed cycle (five milliseconds) to the image scanner 12, so that the image scanner 12 repeatedly scans the document. Data read from three scans of the image scanner 12 are outputted from the binary coding circuit 14 as binary data D11, D12, and D13 (which include binary data x1, x2, and x3 respectively). The second read control section 20B controls the change-over switch 18 during this slow speed to connect the output of the combining circuit 116 to the S/P conversion circuit 24.

While the binary data x1 (included in the binary data D11 shown in FIG. 9) is outputted from the binary coding circuit 14, the second read control section 20B is outputting <0,0> as control signals SEL 1 and SEL 2 so that the selector 56' outputs from its terminal Y the data of the proceeding line that is inputted to its terminal D from the shift register 50. Because of this, the output Y from the shift register 50 is again inputted unchanged to the shift register 50 as reference data.

While the binary data x2 (included in the binary data D12 shown in FIG. 9) is outputted from the binary coding circuit 14, the second read control section 20B is outputting <1,0> as control signals SEL 1 and SEL 2 so that the selector 56' outputs from its terminal Y the data inputted to its terminal A (that is, output formed by the inverted Y·x2 calculation of the AND circuit 52). As a result, the logic product of x2 and the inverted output Y from the shift register 50 is inputted to the shift register 50.

While the binary data x3 (included in the binary data D13 shown in FIG. 9) is outputted from the binary coding circuit 14, the second read control section 20B is outputting <0,1> as control signals SEL 1 and SEL 2 so that the selector 56' outputs from its terminal Y the data inputted to its terminal B (that is, output formed by the inverted Y·x2+X3 calculation of the OR circuit 54). As a result, the logic sum of x3 and output from the shift register 50 (i.e., the results of calculations performed on the x2 of the proceeding line) is inputted to the shift register 50. In synchronization with this, the CPU 28 feeds the document one line distance and stores the outputted data in the RAM 32.

When the document has been fed a predetermined number of lines at the slow speed, the third read control section 20C drives the motor 22 to increase its speed to one half (½) the rated speed, that is, to feed one line in 10 milliseconds. Therefore, in 40 milliseconds the document is fed four lines and the image scanner 12 scans eight times. As shown in FIG. 9, at this intermediate speed the document is fed lines L3, L4, L5, and L6 during the interval between when the binary data D31 is obtained in the first scan and when the binary data group D6 is obtained in the eighth scan. Even though the speed of the motor 22 is increased, the third read control section 20C continues, from the slow speed, to cause the output from the combining circuit 116 to be connected to the S/P conversion circuit 24. Therefore, the combining circuit 116 calculates pixel data for line L3 from the binary data groups D31, D32, and D33 obtained at a five-millisecond cycle and for line L4 from the binary data D41, D42, and D43 also obtained at a five-millisecond cycle and then outputs the pixel data to the S/P conversion circuit 24.

When the scan for binary data D43 is completed, the third read control section 20C controls the change-over switch 18 to connect the output of the binary coding circuit 14 directly with the S/P conversion circuit 24. As a result, data read by the image scanner 12 and binary coded in the binary coding circuit 14 to form binary data D5 and D6 is outputted directly to the S/P conversion circuit 24 as pixel data for lines L5 and L6.

After the document is fed a predetermined number of lines at the intermediate feed speed, the first read control section 20A drives the motor 22 to increase its speed to the rated speed. The first read control section 20A continues to control the change-over switch 18 to connect the output of the binary coding circuit 14 directly to the binary coding circuit 14. As a result, lines L7, L8, and on of the document are fed in five milliseconds in synchronization with output of corresponding binary data D7, D8, and so on from the binary coding circuit 14 to the S/P conversion circuit 24.

Figure 10:
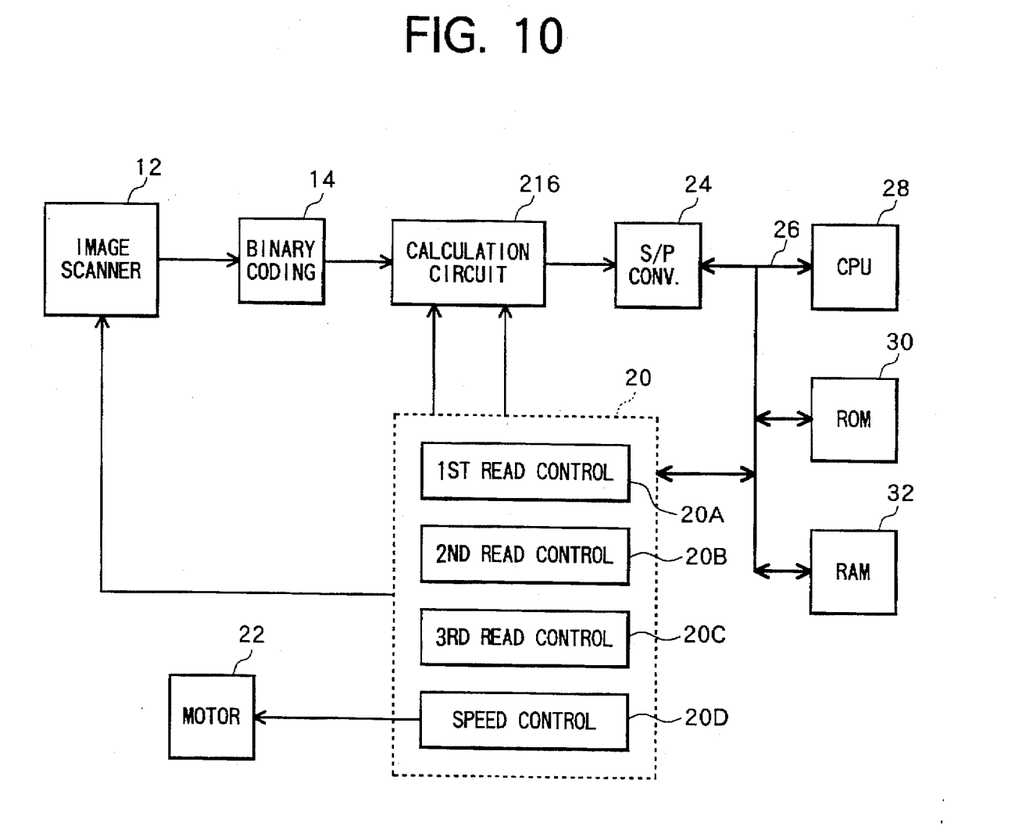
FIG. 10 is a block diagram showing an electrical arrangement of an image reading device according to a fourth embodiment of the present invention.
Figure 11:
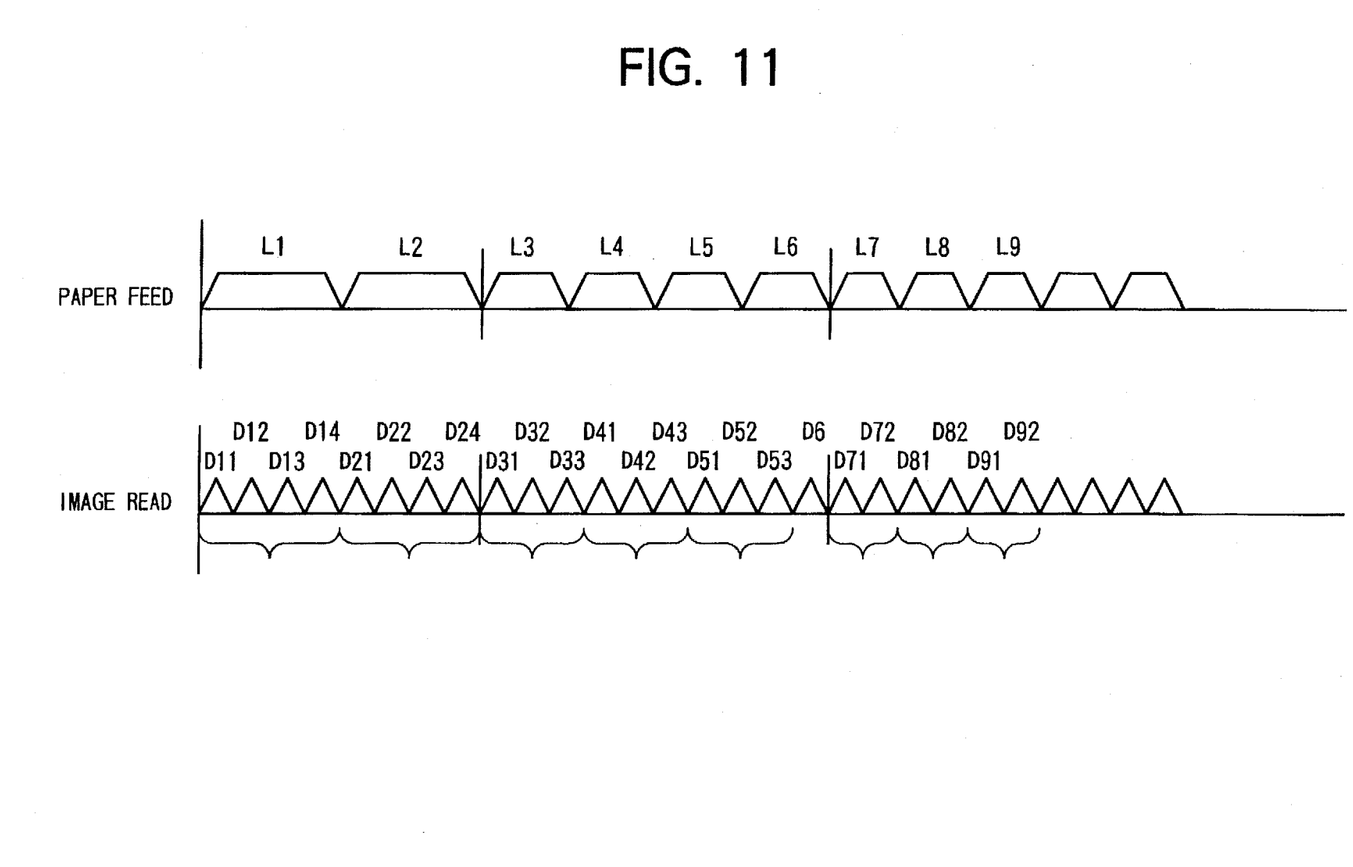
FIG. 11 is a timing chart for describing an operation of the image reading device according to the fourth embodiment of the present invention.

Next, a description of an image reading device according to the fourth embodiment of the present invention will be provided while referring to FIGS. 10 and 11. First, a description of the electrical components will be described while referring to FIG. 10. The image reading device includes a calculation circuit 216 for processing one through four scans. The calculation circuit 216 has the same configuration as the combining circuit 116 of the third embodiment. FIG. 11 is a time chart for comparing timing at which the document is fed and timing of scans by the image scanner 12. First, the read control circuit 20 applies 220 pps drive pulses to the motor 22 so that the document is fed one line distance in 20 milliseconds. As shown in FIG. 11, the document is feed lines L1 and L2 at this slow feed speed. The second read control section 20B causes the image scanner 12 to scan the document in the main-scanning direction at a five-millisecond cycle. Each time the document is fed in the auxiliary-scanning direction, the image scanner 12 scans the document four times. Accordingly, during the interval when the document is being fed the first line L1, the binary coding circuit 14 outputs binary data D11, D12, D13, and D14 which include binary data x1, x2, x3, and x4 respectively.

As a result of control signals SEL 1 and SEL 2 from the second read control section 20B, the calculation circuit 216 outputs one line's worth of data for every four scans of the image scanner 12 in the main-scanning direction. First, as described for the third embodiment, inverted Y·x2+x3 output is obtained for three scans of data. Next, when the binary coding circuit 14 outputs binary data x4 included in the binary data D14 of FIG. 11, the second read control section 20B outputs <0,0> as control signals SEL 1 and SEL 2. As a result, the selector 56' outputs from its terminal Y the output from the shift register 50 inputted to its terminal D. The CPU 28 stores this output in the RAM 32 in synchronization with feed of one line of the document.

After the document is fed a predetermined number of lines at this slow speed, the third read control section 20C applies 320 pps drive pulses to the motor 22 so that lines L3, L4, L5, and L6 of the document are fed in the auxiliary-scanning direction in 12.5 milliseconds. The image scanner 12 performs ten scans while the document is fed this fourline distance.

The third read control section 20C controls the calculation circuit 216 to obtain one line's worth of pixel data from three scans of data. This operation is the same as described in the third embodiment and so its description will be omitted here. When three lines' worth of data is obtained in nine scans, the third read control section 20C outputs <1,1> as control signals SEL 1 and SEL 2. As a result, the selector 56' outputs from its terminal Y the data inputted to its terminal C from the binary coding circuit 14.

At this intermediate feed speed, three lines of pixel data each formed from threes scans' worth of data are used with a line of pixel data formed from one scan's worth of data.

After the motor 22 feeds the document a predetermined number of lines at the intermediated speed, the first read control section 20A begins applying 400 pps drive pulses to the motor 22. This increases the feed speed in the auxiliary-scanning direction to the rated speed, so that one of lines L7, L8, L9 and so on are fed in 10 milliseconds. At this feed speed, the document is fed one line for two scans by the image scanner 12.

The first read control section 20A outputs <1,0> to the calculation circuit 216 as the control signals SEL 1 and SEL 2. The selector 56' outputs from its terminal Y the ANDed result of the data x1 from the first scan and the inverted Y output from the shift register 50. When the control signals SEL 1 and SEL 2 are changed to <0,1> for data from the second scan, the selected 56 outputs from its terminal Y the ORed result of the data x2 from the second and the inverted Y·x1 output. This operation is almost the same as the operations performed in the combining circuit 16 of the first preferred embodiment, However, in the present embodiment, the CPU 28 stores the output from terminal Y of the combining circuit 16 into the RAM 32.

The change-over switch 18 and the selector 56' of the present embodiment operate together to selectively transmit data either read from a single scan, or combined from data read from a plurality of scans, to the S/P conversion circuit 24.

As is clear from the above-described embodiments, the number of scans in the main-scanning direction for obtaining one line's worth of data at various feed speeds in the auxiliary-scanning direction can be optionally selected.

Assuming that the letter M represents the number of scans in the main-scanning direction for obtaining one line's worth of data at the rated speed;

N represent the same number of scans in the main-scanning direction for obtaining one line's worth of data at a slow speed;

m represents the number of scans in the main-scanning direction for each line for obtaining a-line's worth of data at an intermediate speed; and n represent the same number of scans in the main-scanning direction for obtaining b-line's worth of data at the intermediate speed; then the following equation shows the relationship between these values:

$$N > (ma+nb)/(a+b) > M$$

That is, the number of scans in the main-scanning direction to obtain data for each line of pixel data grows increasingly small as the feed speed increases from the slow speed to the intermediate speed to the rated speed. This prevents loss of data during different stages of the staged speed increase of the motor 22. By combining the m-number of scans with the n-number of scans, data can be read without losing data even at intermediate speeds at which coordination is impossible with any one type of main scan.

In the above-described embodiments, the document was fed in the auxiliary-scanning direction and the image scanner fixed in place. However, the image scanner could be moved in the auxiliary-scanning direction and the document stationary.

The image reading device of the present invention allows image read while maintaining the image scanner at fixed scan speed. By combining different numbers of scans, data can be read without losing data even at speeds in the auxiliary-scanning direction at which coordination is impossible with any one type of main scan.

What is claimed is:

1. An image reading device comprising:
    an image scanner for reading an image from a document by scanning the document at a fixed speed in a main-scanning direction;
    a motor for feeding the document at a speed in an auxiliary-scanning direction perpendicular to the main-scanning direction;
    speed control means for controlling the speed at which said motor feeds the document;
    first read control means for obtaining one line's worth of data from data obtained by M-scans of said image scanner when said motor is feeding the document at a first speed A;
    second read control means for obtaining one line's worth of data from data obtained by N-scans of said image scanner when said motor is feeding the document at a second speed A×M/N; and
    third read control means for obtaining a-number lines' worth of data, each line's worth of data of the a-number lines' worth of data being obtained by m-scans of said image scanner, and for obtaining b-number lines' worth of data, each line's worth of data of the b-number lines' worth of data being obtained by n-scans of said image scanner, when said motor is feeding the document at a third speed that is between the first speed A and the second speed A×M/N,
    wherein a relationship between values of M, N, a, b, m, and n is represented by:

$$N > (ma+nb)/(a+b) > M.$$

2. An image reading device as claimed in claim 1, further comprising calculation means for calculating data in a present line based on data of a proceeding line and data obtained from a plurality of scans by said image scanner.

3. An image reading device as claimed in claim 1, wherein a relationship between the values of M, N, m, and n is given by:

$$M \geq m;$$

and $N \geq n.$

4. An image reading device as claimed in claim 1, wherein a relationship between values M, N, m, and n is given by:

$M=m=1;$ and $N \geq n.$

5. An image reading device as claimed in claim 4, further comprising:
calculation means for calculating data in a present line based on data of a proceeding line and data obtained from a plurality of scans by said image scanner: and data selection means for selecting one of data read by said image scanner and data calculated by said calculation means, said data selection means using said first read control means to select data read by said image scanner, using said second read control means to select data calculated by said calculation means, and using said third read control means to combine data read by said image scanner with data calculated by said calculation means to produce combined data and to select the combined data.

6. An image reading device as claimed in claim 5, wherein said data selection means uses said third read control means to first select data calculated by said calculation means and then select data read by said image scanner.

7. An image reading device as claimed in claim 5, wherein said data selection means uses said third read control means to alternately select between data calculated by said calculation means and data read by said image scanner.

8. An image reading device comprising:
an image scanner for reading an image from a document by repeatedly scanning the document on a line-to-line basis at a fixed speed and for producing a block of line data whenever said image scanner scans one line of the document, the block of line data including pixel data on each pixel aligned on a line of the document along which said image scanner scans;
a motor for feeding the document at a speed in a direction perpendicular to a direction in which said image scanner scans the document;
speed control means for controlling said motor so that the speed at which said motor feeds the document is sequentially increased from a first speed to a second speed faster than the first speed and to a third speed faster than the second speed, wherein scanning the document by said image scanner is performed at a fixed time rate regardless of the speed at which said motor feeds the document; and
line data producing means for producing a number of blocks of line data equal to a number of lines fed by said motor when said motor feeds the document at the first speed or the second speed by using all of the blocks of line data produced from said image scanner during feeding of the document at the first speed or the second speed
wherein at least one of the blocks of line data produced by said line data producing means is produced by combining a predetermined number of consecutive blocks of line data produced from said image scanner during feeding of the document at the first speed or the second speed.

9. An image reading device as claimed in claim 8, wherein the predetermined number of consecutive blocks of line data is two.

10. An image reading device as claimed in claim 9, wherein said at least one of the blocks of line data is produced by further combining a block of line data of a proceeding line.

11. An image reading device as claimed in claim 10, wherein said line data producing means further comprises selection means for selecting the at least one of the blocks of line data and each of the blocks of line data produced from said image scanner.

12. An image reading device as claimed in claim 8, wherein the predetermined number of consecutive blocks of line data is three.

13. An image reading device as claimed in claim 12, wherein said at least one of the blocks of line data is produced by further combining a block of line data of a proceeding line.

14. An image reading device as claimed in claim 13, wherein said line data producing means further comprises selection means for selecting the at least one of the blocks of line data and each of the blocks of line data produced from said image scanner.

15. An image reading device comprising:
an image scanner for reading an image from a document by repeatedly scanning the document on a line-to-line basis at a fixed speed and for producing a block of line data whenever said image scanner scans one line of the document, the block of line data including pixel data on each pixel aligned on a line of the document along which said image scanner scans;
a motor for feeding the document at a speed in a direction perpendicular to a direction in which said image scanner scans the document;
speed control means for controlling said motor so that the speed at which said motor feeds the document is selectively changed to a first speed A, a second speed A×M/N, and a third speed that is between the first speed A and the second speed A×M/N, wherein scanning the document by said image sensor is performed in synchronization with feeding the document by said motor when said motor feeds the document at the first speed A;
line data producing means for producing a number of blocks of line data equal to a number of lines fed by said motor when said motor feeds the document at the second speed A×M/N or the third speed by using all of blocks of line data produced from said image scanner during feeding of the document at the second speed A×M/N or the third speed, wherein said line data producing means comprises:
first producing means for producing one line's worth of data from data obtained by M-scans of said image scanner when said motor is feeding the document at the first speed A;
second producing means for producing one line's worth of data from data obtained by N-scans of said image scanner when said motor is feeding the document at the second speed A×M/N; and
third producing means for producing a-number lines' worth of data, each line's worth of data of the a-number lines' worth of data being obtained by m-scans of said image scanner, and for obtaining b-number lines' worth of data, each line's worth of data of the b-number lines' worth of data being obtained by n-scans of said image scanner, when said motor-is feeding the document at the third speed, wherein a relationship between values of M, N, a, b, m, and n is represented by:

$$N > (ma+nb)/(a+b) > M.$$

16. An image reading device as claimed in claim 15, wherein a relationship between the values of M, N, m, and n is given by:

$$M \geq m;$$

and $$N \geq n.$$

17. An image reading device as claimed in claim 15, wherein a relationship between values M, N, m, and n is given by:

$$M = m = 1;$$

and $$N \geq n.$$

* * * * *